(12) United States Patent
You et al.

(10) Patent No.: US 12,174,669 B2
(45) Date of Patent: Dec. 24, 2024

(54) HINGE APPARATUS AND FOLDABLE DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Chuankun You, Beijing (CN); Wei Qing, Beijing (CN); Jun Zhang, Beijing (CN); Fengping Wu, Beijing (CN); Zhihui Wang, Beijing (CN)

(73) Assignees: Beijing BOE Technology Development Co., Ltd., Beijing (CN); Chengdu BOE Optoelectronics Technology Co., Ltd., Sichuan (CN)

( * ) Notice: Subject to any disclaimer, the term of this patent is extended or adjusted under 35 U.S.C. 154(b) by 0 days.

(21) Appl. No.: 18/023,003

(22) PCT Filed: Mar. 31, 2022

(86) PCT No.: PCT/CN2022/084577
§ 371 (c)(1),
(2) Date: Feb. 24, 2023

(87) PCT Pub. No.: WO2023/184409
PCT Pub. Date: Oct. 5, 2023

(65) Prior Publication Data
US 2024/0288902 A1 Aug. 29, 2024

(51) Int. Cl.
*G06F 1/16* (2006.01)
(52) U.S. Cl.
CPC .......... *G06F 1/1652* (2013.01); *G06F 1/1681* (2013.01)

(58) Field of Classification Search
None
See application file for complete search history.

(56) References Cited

U.S. PATENT DOCUMENTS

2019/0179373 A1* 6/2019 Cheng ................ H04M 1/0216
2020/0371561 A1* 11/2020 Lin ........................... E05D 3/18
(Continued)

FOREIGN PATENT DOCUMENTS

| CN | 110778598 A | 2/2020 |
|---|---|---|
| CN | 110995892 A | 4/2020 |

(Continued)

*Primary Examiner* — Nicholas J Lee
(74) *Attorney, Agent, or Firm* — Ling Wu; Stephen Yang; Ling and Yang Intellectual Property

(57) ABSTRACT

Disclosed is a hinge apparatus including a rotating portion and a co-moving portion; the rotating portion includes a first supporting plate, a second supporting plate, a first connection plate, and a second connection plate; the first connection plate and the second connection plate are respectively connected with the first supporting plate and the second supporting plate in a slidable manner; the co-moving portion includes a first connection rod, a second connection rod, a first rotating shaft, a second rotating shaft, and a transmission apparatus; the first connection rod is fixedly connected on the first rotating shaft and is connected with the first connection plate in a slidable manner, the second connection rod is fixedly connected on the second rotating shaft and is connected with the second connection plate in a slidable manner, and the transmission apparatus is disposed to rotate the first rotating shaft and the second rotating shaft synchronously.

20 Claims, 10 Drawing Sheets

(56) References Cited

U.S. PATENT DOCUMENTS

| | | | |
|---|---|---|---|
| 2020/0375046 A1* | 11/2020 | Sim | H05K 5/0017 |
| 2021/0173449 A1* | 6/2021 | Yao | G06F 1/1616 |
| 2021/0181808 A1 | 6/2021 | Liao et al. | |
| 2021/0243908 A1 | 8/2021 | Park et al. | |
| 2021/0247814 A1* | 8/2021 | Nguyen | G06F 1/1681 |
| 2021/0250431 A1* | 8/2021 | Park | G06F 1/1681 |
| 2021/0255671 A1* | 8/2021 | Huang | G06F 1/1681 |
| 2021/0271294 A1 | 9/2021 | Liao et al. | |
| 2021/0365073 A1* | 11/2021 | Cha | G06F 1/1652 |
| 2021/0368032 A1* | 11/2021 | Liao | G06F 1/1681 |
| 2022/0019268 A1* | 1/2022 | Yu | G09F 9/30 |
| 2022/0116489 A1 | 4/2022 | Nagai et al. | |
| 2022/0217859 A1* | 7/2022 | Lee | H05K 5/0017 |
| 2023/0047119 A1* | 2/2023 | Yang | G06F 1/1681 |
| 2023/0353665 A1* | 11/2023 | Han | F16C 11/04 |

FOREIGN PATENT DOCUMENTS

| | | |
|---|---|---|
| CN | 111692196 A | 9/2020 |
| CN | 111866223 A | 10/2020 |
| CN | 111866239 A | 10/2020 |
| CN | 111901458 A | 11/2020 |
| CN | 112153178 A | 12/2020 |
| CN | 112178041 A | 1/2021 |
| CN | 112995368 A | 6/2021 |
| CN | 113053238 A | 6/2021 |
| EP | 4040762 A1 | 8/2022 |
| EP | 4063996 A1 | 9/2022 |
| JP | 2020-53001 A | 4/2020 |
| WO | 2021206451 A2 | 10/2021 |

* cited by examiner

HINGE APPARATUS AND FOLDABLE DISPLAY APPARATUS

CROSS-REFERENCE TO RELATED APPLICATION

The present application is a U.S. National Phase Entry of International Application No. PCT/CN2022/084577 having an international filing date of Mar. 31, 2022. The entire contents of the above-identified application are hereby incorporated by reference.

TECHNICAL FIELD

Embodiments of the present disclosure relate to, but are not limited to, the field of display technologies, specifically to a hinge apparatus and a foldable display apparatus.

BACKGROUND

Some foldable display products with U-shaped inward folding will have different degrees of creases on screens after being bent for many times, which will affect a display effect.

SUMMARY

The following is a summary of subject matters described herein in detail. The summary is not intended to limit the protection scope of claims.

An embodiment of the present disclosure provides a hinge apparatus, which includes a rotating portion and a co-moving portion; the rotating portion includes a guide groove seat, a first supporting plate, a second supporting plate, a first connection plate, and a second connection plate; the guide groove seat is provided with a first non-circular arc guide groove, a second non-circular arc guide groove, a first circular arc guide groove, and a second circular arc guide groove; the first supporting plate is provided with a first non-circular arc rotating portion which is rotationally fitted with the first non-circular arc guide groove, the second supporting plate is provided with a second non-circular arc rotating portion which is rotationally fitted with the second non-circular arc guide groove, the first connection plate is provided with a first circular arc rotating portion which is rotationally fitted with the first circular arc guide groove, and the second connection plate is provided with a second circular arc rotating portion which is rotationally fitted with the second circular arc guide groove; the first connection plate is connected on the first supporting plate in a slidable manner, and the second connection plate is connected on the second supporting plate in a slidable manner; the co-moving portion includes a first connection rod, a second connection rod, a fixing seat, a first rotating shaft and a second rotating shaft disposed in the fixing seat in a rotatable manner and arranged in parallel, and a transmission apparatus; the first connection rod is fixedly connected on the first rotating shaft and is connected with the first connection plate in a slidable manner, the second connection rod is fixedly connected on the second rotating shaft and is connected with the second connection plate in a slidable manner, and the transmission apparatus is disposed to rotate the first rotating shaft and the second rotating shaft synchronously.

An embodiment of the disclosure also provides a foldable display apparatus, which includes a flexible display module and a middle frame assembly, wherein the middle frame assembly includes a first plate body, a second plate body, and the hinge apparatus; the first plate body is fixedly connected with the first supporting plate, and the second plate body is fixedly connected with the second supporting plate; a side of the flexible display module facing away from a display side is fixed on the first plate body and the second plate body.

An embodiment of the present disclosure also provides a foldable display apparatus, which includes a flexible display module and the hinge apparatus, wherein a side of the flexible display module facing away from a display side is fixed on the first supporting plate and the second supporting plate.

Other aspects may be understood upon reading and understanding drawings and detailed description.

BRIEF DESCRIPTION OF DRAWINGS

The drawings are intended to provide a further understanding of technical solutions of the present disclosure and constitute a part of the specification, and are used for explaining the technical solutions of the present disclosure together with embodiments of the present disclosure, and not intended to constitute limitations on the technical solutions of the present disclosure.

FIG. 4 is a schematic diagram of an explosion structure of a guide groove seat of the hinge apparatus of FIG. 1a.

DETAILED DESCRIPTION

Figure 1A:
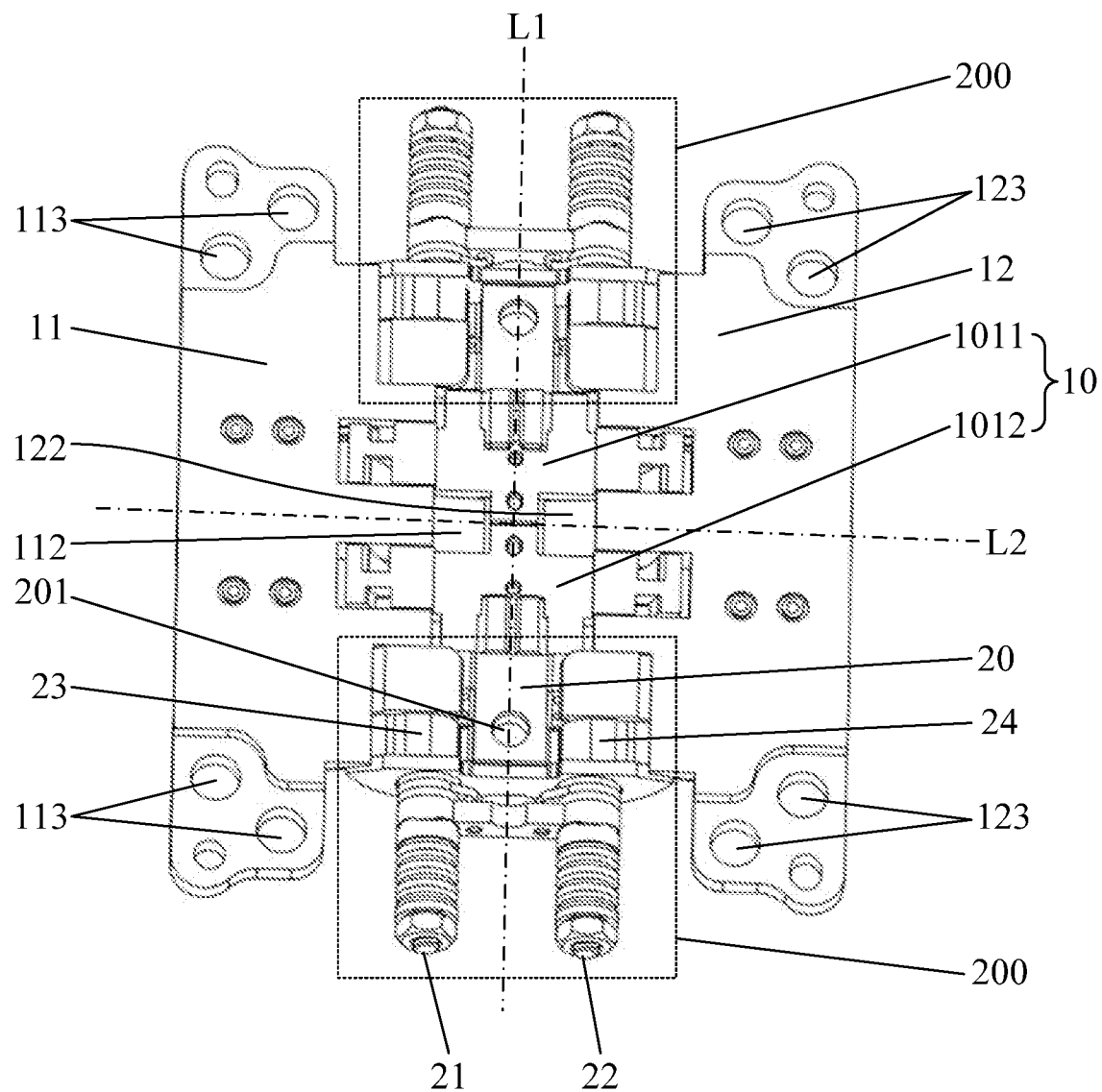
FIG. 1a is a schematic diagram of a structure of a hinge apparatus in a deployed state according to some exemplary embodiments.

Those of ordinary skills in the art should understand that modifications or equivalent replacements may be made to the technical solutions of the embodiments of the present disclosure without departing from the spirit and scope of the technical solutions of the embodiments of the present disclosure, and should all fall within the scope of the claims of the present disclosure.

An embodiment of the present disclosure provides a hinge apparatus, which includes a rotating portion and a co-moving portion.

The rotating portion includes a guide groove seat, a first supporting plate, a second supporting plate, a first connection plate, and a second connection plate; the guide groove seat is provided with a first non-circular arc guide groove, a second non-circular arc guide groove, a first circular arc guide groove, and a second circular arc guide groove; the first supporting plate is provided with a first non-circular arc rotating portion which is rotationally fitted with the first non-circular arc guide groove, the second supporting plate is provided with a second non-circular arc rotating portion which is rotationally fitted with the second non-circular arc guide groove, the first connection plate is provided with a first circular arc rotating portion which is rotationally fitted with the first circular arc guide groove, and the second connection plate is provided with a second circular arc rotating portion which is rotationally fitted with the second circular arc guide groove; the first connection plate is connected with the first supporting plate in a slidable manner, and the second connection plate is connected with the second supporting plate in a slidable manner.

The co-moving portion includes a first connection rod, a second connection rod, a fixing seat, a first rotating shaft and a second rotating shaft disposed in the fixing seat in a rotatable manner and arranged in parallel, and a transmission apparatus; the first connection rod is fixedly connected with the first rotating shaft and is connected with the first connection plate in a slidable manner, the second connection rod is fixedly connected with the second rotating shaft and is connected with the second connection plate in a slidable manner, and the transmission apparatus is disposed to rotate the first rotating shaft and the second rotating shaft synchronously.

In the hinge apparatus according to the embodiment of the present disclosure, rotation of the first supporting plate and the second supporting plate may respectively drive the first connection plate and the second connection plate to rotate, and then the first rotating shaft and the second rotating shaft are respectively driven to rotate through the first connection rod and the second connection rod, the first rotating shaft and the second rotating shaft keep synchronous rotation through the transmission apparatus, thus finally achieving synchronous rotation of the first supporting plate and the second supporting plate. In addition, since both the first supporting plate and the second supporting plate are rotationally fitted with a non-circular arc guide groove of the guide groove seat through a non-circular arc rotating portion, rotation tracks of the first supporting plate and the second supporting plate are both non-circular arc tracks. When the hinge apparatus according to the embodiment of the present disclosure is applied to a foldable display apparatus (which may be a foldable display apparatus with U-shaped folding), a display screen may be driven to bend through rotation of the first supporting plate and the second supporting plate, so as to achieve switching between a deployed state and a folded state of the foldable display apparatus; since the rotation tracks of the first supporting plate and the second supporting plate are both non-circular arc tracks, a bending track of the display screen is a non-circular arc track, compared with a bending track of the display screen being a circular arc track, a stretching amount of the display screen may be compensated in real time during a bending process of the display screen, the screen will not be pulled or squeezed during the bending process, and stress in a bending region of the display screen may be reduced (in some examples, it may be reduced from 2.7% to 0.5%) to reduce a damage to a film layer of the screen, thus improving a crease problem of the display screen.

In some exemplary embodiments, the first connection plate and the second connection plate are each provided as two, and the co-moving portion is provided as two; a first connection rod of one of the two co-moving portions is connected with one of the two first connection plates, and a first connection rod of the other of the two co-moving portions is connected with the other of the two first connection plates; a second connection rod of one of the two co-moving portions is connected with one of the two second connection plates, and a second connection rod of the other of the two co-moving portions is connected with the other of the two second connection plates; the first supporting plate and the second supporting plate are symmetrically disposed on both sides of the guide groove seat along a first direction, and the two co-moving portions are symmetrically disposed on both sides of the guide groove seat along a second direction, wherein the first direction and the second direction are perpendicular to each other.

In an example of this embodiment, the two first connection plates and the two second connection plates are all symmetrically disposed on both sides of the guide groove seat along the second direction, and the first connection plate and the second connection plate that are connected with a same co-moving portion are symmetrically disposed on both sides of the guide groove seat along the first direction.

In an example of this embodiment, the guide groove seat is arranged symmetrically with respect to a first symmetry axis and arranged symmetrically with respect to a second symmetry axis, wherein the first symmetry axis is parallel to the first direction, and the second symmetry axis is parallel to the second direction.

Exemplarily, the guide groove seat includes two sub-guide groove seats arranged symmetrically with respect to the second symmetry axis, each of the sub-guide groove seats is arranged symmetrically with respect to the first symmetry axis; each of the sub-guide groove seat is divided into two parts by the first symmetry axis, and each part of the two parts is provided with a non-circular arc guide groove and a circular arc guide groove.

The first supporting plate is provided with two first non-circular arc rotating portions, and the two first non-circular arc rotating portions are respectively rotationally fitted with two non-circular arc guide grooves located on one side of the first symmetry axis; the second supporting plate is provided with two second non-circular arc rotating portions, and the two second non-circular arc rotating portions are respectively rotationally fitted with two non-circular arc guide grooves located on the other side of the first symmetry axis.

The two first connection plates are each provided with one first circular arc rotating portion, and the two first circular arc rotating portions are respectively rotationally fitted with two circular arc guide grooves located on one side of the first symmetry axis; the two second connection plates are each provided with one second circular arc rotating portion, and the two second circular arc rotating portions are respectively rotationally fitted with two circular arc guide grooves located on the other side of the first symmetry axis.

Exemplarily, the hinge apparatus is arranged symmetrically with respect to the first symmetry axis and arranged symmetrically with respect to the second symmetry axis.

Figure 1B:
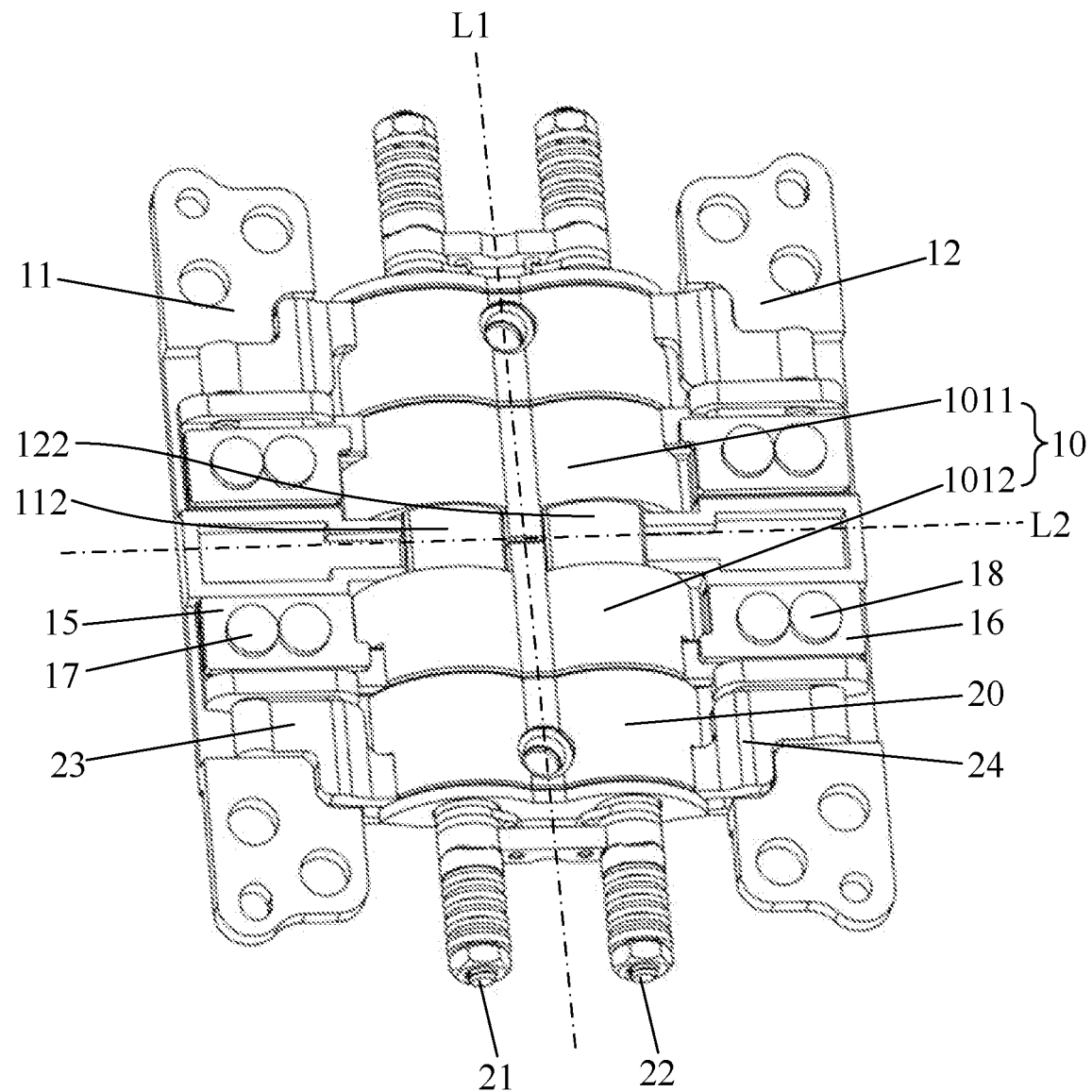
FIG. 1b is a schematic diagram of a structure of the hinge apparatus of FIG. 1a from another perspective.
Figure 2:
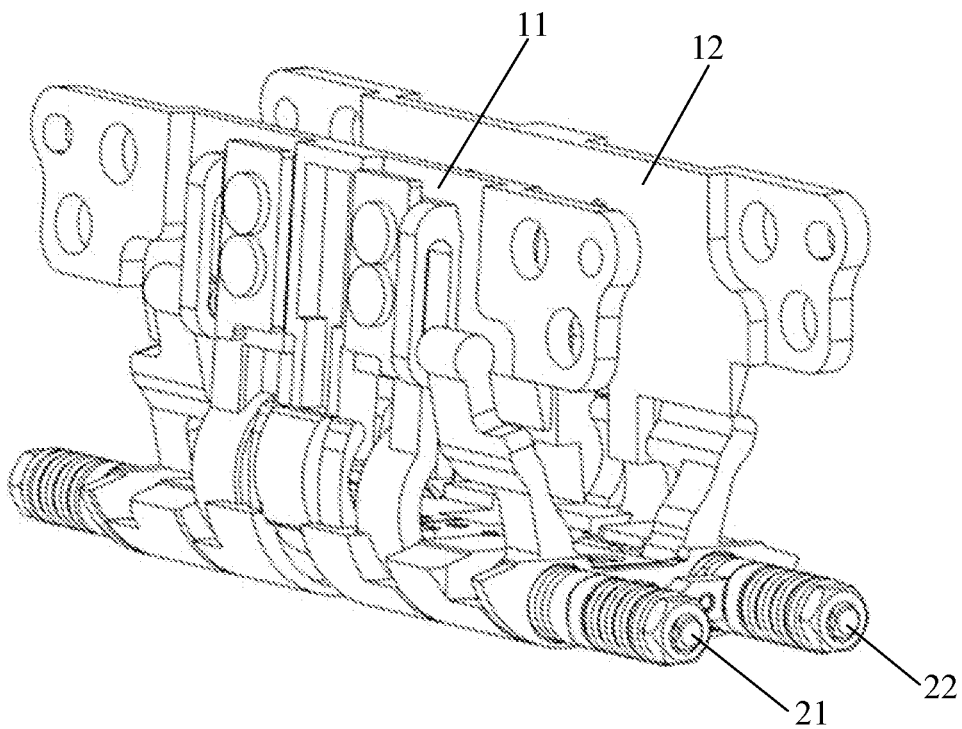
FIG. 2 is a schematic diagram of a structure of the hinge apparatus of FIG. 1 in a folded state.

In some exemplary embodiments, as shown in FIG. 1a, FIG. 1b, and FIG. 2, FIG. 1a is a schematic diagram of a structure of a hinge apparatus in a deployed state according to some exemplary embodiments, FIG. 1b is a schematic diagram of a structure of the hinge apparatus of FIG. 1a from another perspective, and FIG. 2 is a schematic diagram of a structure of the hinge apparatus of FIG. 1a in a folded state, wherein the hinge apparatus includes a rotating portion and a co-moving portion 200. The rotating portion includes a guide groove seat 10, a first supporting plate 11, a second supporting plate 12, a first connection plate 13, and a second connection plate.

Figure 3A:
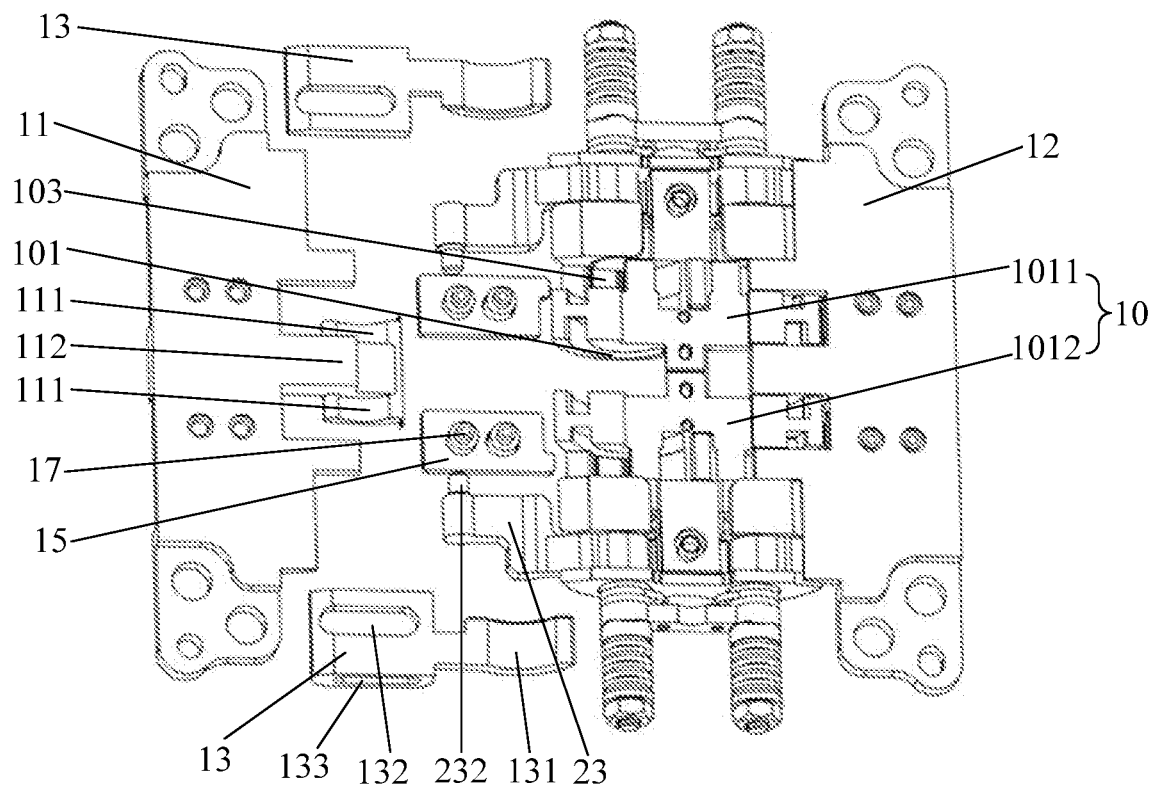
FIG. 3a is a schematic diagram of a structure of the hinge apparatus of FIG. 1a in a local explosion state.
Figure 3B:
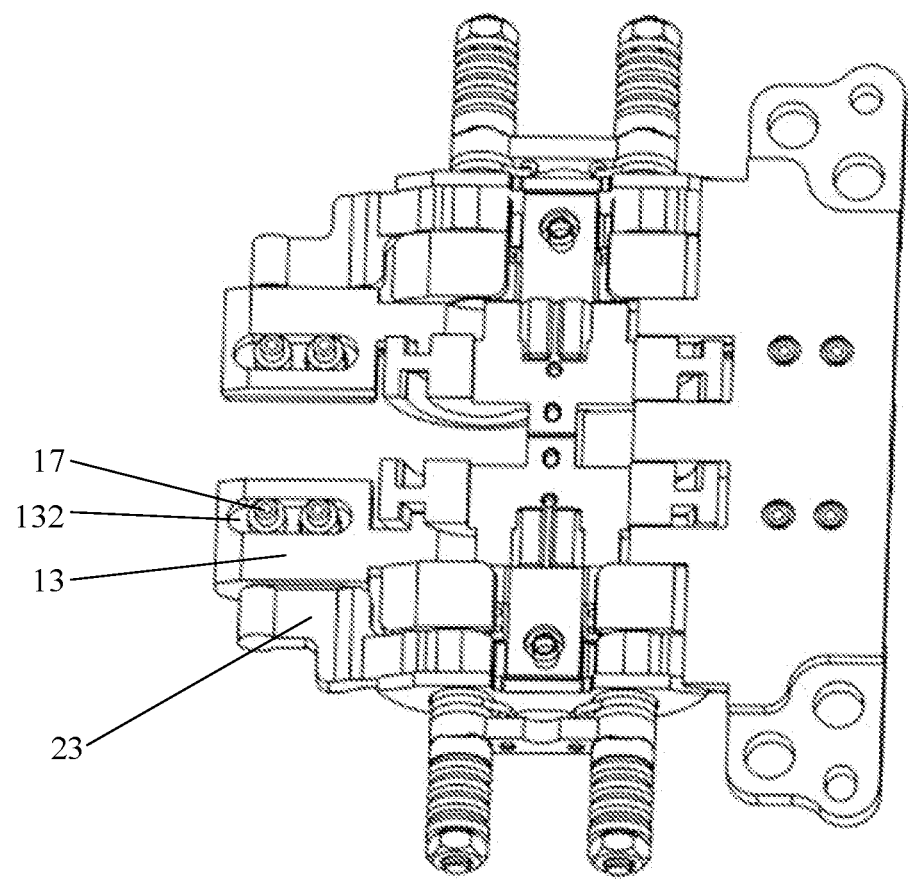
FIG. 3b is a schematic diagram of a structure of the hinge apparatus of FIG. 1a after removing a first support.
Figure 4:
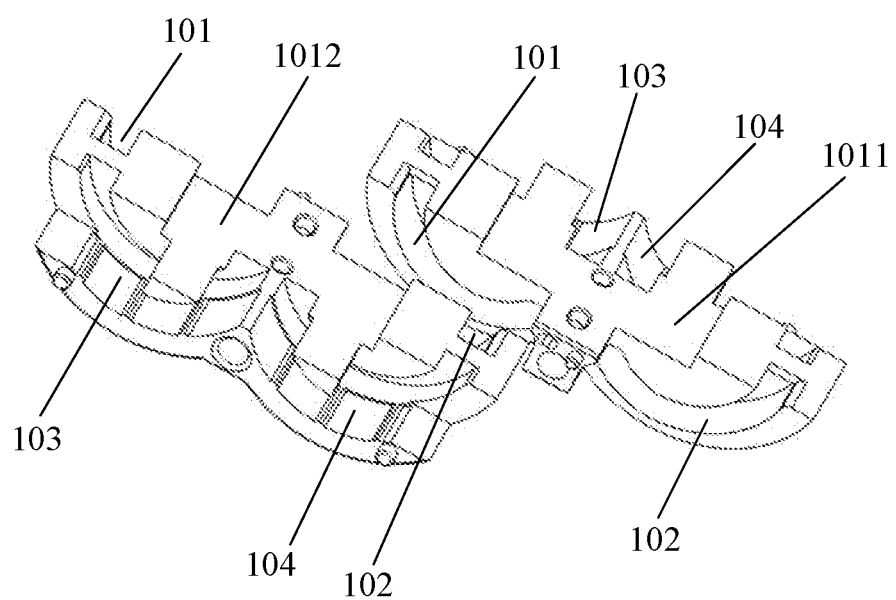

As shown in FIG. 3a, FIG. 3b, and FIG. 4, FIG. 3a is a schematic diagram of a structure of the hinge apparatus of FIG. 1a in a local explosion state, FIG. 3b is a schematic diagram of a structure of the hinge apparatus of FIG. 1a after removing a first support, FIG. 4 is a schematic diagram of an explosion structure of a guide groove seat of the hinge apparatus of FIG. 1a, the guide groove seat 10 includes two sub-guide groove seats, which are a first sub-guide groove seat 1011 and a second sub-guide groove seat 1012 respectively, the two sub-guide groove seats are symmetrically arranged with respect to a second symmetry axis L2, and each of the sub-guide groove seats is symmetrically arranged with respect to a first symmetry axis L1; each of the sub-guide groove seats is divided into two parts by the first symmetry axis L1, each of the two parts is provided with one non-circular arc guide groove and one circular arc guide groove. Among them, each sub-guide groove seat is provided with one first non-circular arc guide groove 101, one second non-circular arc guide groove 102, one first circular arc guide groove 103, and one second circular arc guide groove 104; in each sub-guide groove seat, the first non-circular arc guide groove 101 and the first circular arc guide groove 103 are located on one side of the first symmetry axis L1, and the second non-circular arc guide groove 102 and the second circular arc guide groove 104 are located on the other side of the first symmetry axis L1. A surface of any one of the sub-guide groove seats facing the other sub-guide groove seat is provided with one first non-circular arc guide groove 101, one second non-circular arc guide groove 102, and a boss located between the first non-circular arc guide groove 101 and the second non-circular arc guide groove 102; bosses of the two sub-guide groove seats are arranged opposite to each other, and two accommodation spaces are formed between the two sub-guide groove seats to respectively accommodate a first protruding portion 112 (provided with two first non-circular arc rotating portions 111) of the first supporting plate 11 and a second protruding portion 122 (provided with two second non-circular arc rotating portions) of the second supporting plate 12; a surface of any one of the sub-guide groove seats facing away from the other sub-guide groove seat is provided with one first circular arc guide groove 103 and one second circular arc guide groove 104, wherein the first non-circular arc guide groove 101 and the second non-circular arc guide groove 102 are respectively located on both sides of the first symmetry axis L1, and the first circular arc guide groove 103 and the second circular arc guide groove 104 are respectively located on both sides of the first symmetry axis L1. Exemplarily, the first non-circular arc guide groove 101 and the second non-circular arc guide groove 102 may be guide grooves with involute tracks.

The first supporting plate 11 and the second supporting plate 12 are symmetrically disposed on both sides of the guide groove seat 10 along a first direction (Exemplarily, the first direction is a direction of the first symmetry axis L1 of the guide groove seat 10). One side edge of the first supporting plate 11 is provided with the first protruding portion 112, two sides of the first protruding portion 112 are provided with two first non-circular arc rotating portions 111. The first protruding portion 112 is disposed in one accommodation space between the two sub-guide groove seats, and the two first non-circular arc rotating portions 111 are rotationally fitted with two first non-circular arc guide grooves 101 of the two sub-guide groove seats respectively. One side edge of the second supporting plate 12 is provided with the second protruding portion 122, two sides of the second protruding portion 122 are provided with two second non-circular arc rotating portions, the second protruding portion 122 is disposed in the other accommodation space between the two sub-guide groove seats, and the two second non-circular arc rotating portions are rotationally fitted with two second non-circular arc guide grooves 102 of the two sub-guide groove seats respectively. An end of the first supporting plate 11 or a portion of the first supporting plate 11 close to an edge may be provided with at least one first mounting hole 113, an end of the second supporting plate 12 or a portion of the second supporting plate 12 close to an edge may be provided with at least one second mounting hole 123. In a practical application, the first supporting plate 11 and the second supporting plate 12 may be fixedly mounted on other apparatuses (such as a middle frame assembly of a foldable display apparatus) through the first mounting hole 113 and the second mounting hole 123, respectively.

The two first connection plates 13 are located on one side of the first symmetry axis L1 of the guide groove seat 10 and located on opposite sides of the two sub-guide groove seats, and are arranged symmetrically with respect to the second symmetry axis L2 of the guide groove seat 10; a first circular arc rotating portion 131 of each first connection plate 13 is rotationally fitted with a first circular arc guide groove 103 of a corresponding sub-guide groove seat, and each first connection plate 13 is also partially located on a first surface of the first supporting plate 11 and is connected on the first supporting plate 11 in a slidable manner. The two second connection plates are located on the other side of the first symmetry axis L1 of the guide groove seat 10 and located on opposite sides of the two sub-guide groove seats, and are symmetrically arranged with respect to the second symmetry axis L2 of the guide groove seat 10; a second circular arc rotating portion of each second connection plate is rotationally fitted with a second circular arc guide groove 104 of a corresponding sub-guide groove seat, and each second connection plate is also partially located on a first surface of the second supporting plate 12 and is connected on the second supporting plate 12 in a slidable manner. In addition, the first connection plate 13 and the second connection plate connected with a same co-moving portion 200 are arranged symmetrically with respect to the first symmetry axis L1 of the guide groove seat 10.

As shown in FIG. 1a, FIG. 1b, FIG. 3a, and FIG. 3b, the two co-moving portions 200 are symmetrically disposed on both sides of the guide groove seat 10 along a second direction (Exemplarily, the second direction is a direction of the second symmetry axis L2 of the guide groove seat 10), the first direction and the second direction are perpendicular to each other, i.e. the two co-moving portions 200 are respectively located on opposite sides of the two sub-guide groove seats and are symmetrically arranged. The co-moving portion 200 includes a first connection rod 23, a second connection rod 24, a fixing seat 20, a first rotating shaft 21 and a second rotating shaft 22 arranged in the fixing seat 20 in a rotatable manner and arranged in parallel, and a transmission apparatus; the first connection rod 23 is fixedly connected on the first rotating shaft 21 and is connected with the first connection plate 13 in a slidable manner, the second connection rod 24 is fixedly connected on the second rotating shaft 22 and is connected with the second connection plate in a slidable manner, and the transmission apparatus is disposed to rotate the first rotating shaft 21 and the second rotating shaft 22 synchronously. Among them, a first connection rod 23 of one of the two co-moving portions 200 is connected with one of the two first connection plates 13, and a first connection rod 23 of the other of the two co-moving portions 200 is connected with the other of the two first connection plates 13; a second connection rod 24 of one of the two co-moving portions 200 is connected with one of the two second connection plates, and a second connection rod 24 of the other of the two co-moving portions 200 is connected with the other of the two second connection plates. In this example, the two co-moving portions 200 are symmetrically arranged, so that rotation of the first supporting plate 11 and the second supporting plate 12 may be more stable and smooth.

In this example, as shown in FIG. 1a and FIG. 1b, the hinge apparatus may be symmetrically arranged with respect to the first symmetry axis L1 and symmetrically arranged with respect to the second symmetry axis L2.

In some exemplary embodiments, as shown in FIG. 1a, FIG. 1b, FIG. 3a, and FIG. 3b, the rotating portion may further include a first fixing plate 15 and a second fixing plate 16; the first fixing plate 15 is fixed on the first supporting plate 11 through a first fastener 17, the first connection plate 13 is sandwiched between the first fixing plate 15 and the first supporting plate 11, the first connection plate 13 is provided with a first sliding hole 132, the first fastener 17 passes through the first sliding hole 132 and can slide along the first sliding hole 132; the second fixing plate 16 is fixed on the second supporting plate 12 through a second fastener 18, the second connection plate is sandwiched between the second fixing plate 16 and the second supporting plate 12, the second connection plate is provided with a second sliding hole, the second fastener 18 passes through the second sliding hole and can slide along the second sliding hole.

Exemplarily, a portion of the first connection plate 13 located on a first surface of the first supporting plate 11 is sandwiched between the first fixing plate 15 and the first supporting plate 11. The first sliding hole 132 may be a long-stripped through hole and its length direction may be parallel to the second direction. In a process that the first supporting plate 11 drives the first connection plate 13 to rotate, the first fastener 17 may slide in the first sliding hole 132 to achieve sliding of the first connection plate 13 relative to the first supporting plate 11. The first fastener 17 may be a screw and may be provided as one, two, or more than two (two are illustrated in this example), and both the first fixing plate 15 and the first supporting plate 11 are provided with fixing holes through which the first fastener 17 passes.

Similarly, a portion of the second connection plate located on a first surface of the second supporting plate 12 is sandwiched between the second fixing plate 16 and the second supporting plate 12. The second sliding hole may be a long-stripped through hole and its length direction may be parallel to the second direction. In a process that the second supporting plate 12 drives the second connection plate to rotate, the second fastener 18 may slide in the second sliding hole to achieve sliding of the second connection plate relative to the second supporting plate 12. The second fastener 18 may be a screw, may be provided as one, two, or more than two (two are illustrated in this example), and both the second fixing plate 16 and the second supporting plate 12 are provided with fixing holes through which the second fastener 18 passes.

In some exemplary embodiments, as shown in FIG. 3a, the first circular arc rotating portion 131 rotates around a first rotation center line, and the second circular arc rotating portion rotates around a second rotation center line, the first rotation center line and the second rotation center line are both parallel to axial directions of the first rotating shaft 21 and the second rotating shaft 22. The axial directions of the first rotating shaft 21 and the second rotating shaft 22 are parallel to the first direction.

Figure 5:
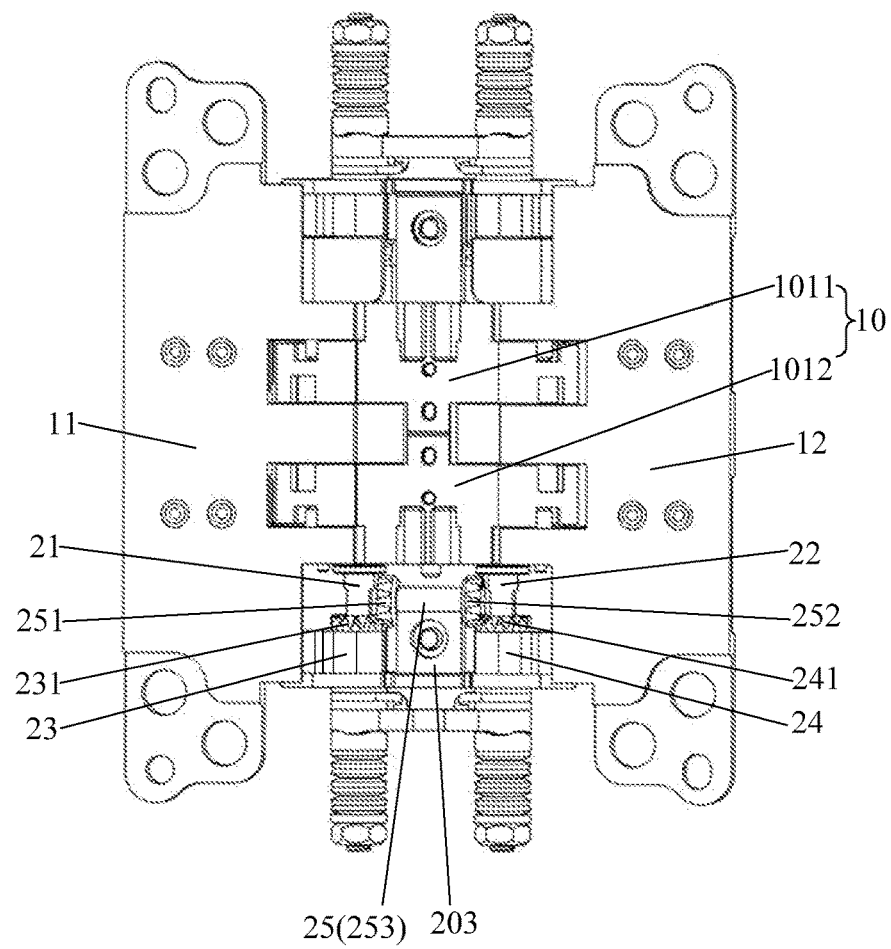
FIG. 5 is a schematic diagram of a planar structure of the hinge apparatus of FIG. 1a in which a seat body of a fixing seat is removed from one of co-moving portions in some exemplary embodiments.
Figure 6A:
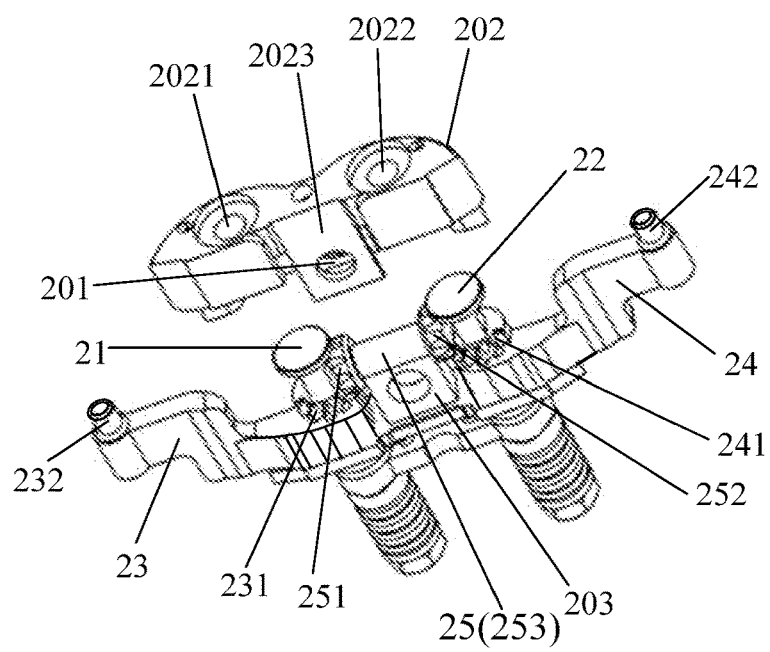
FIG. 6a is a schematic diagram of a local explosion structure of a co-moving portion of the hinge apparatus of FIG. 1a in some exemplary embodiments.
Figure 6B:
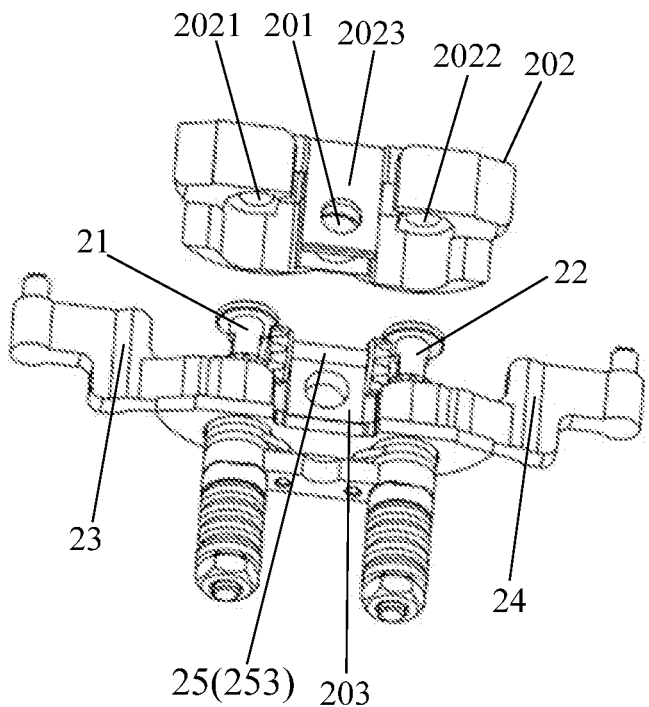
FIG. 6b is a schematic diagram of a local explosion structure of the co-moving portion of FIG. 6a from another perspective.

In some exemplary embodiments, as shown in FIG. 5, FIG. 6a, and FIG. 6b, FIG. 5 is a schematic diagram of a planar structure of the hinge apparatus of FIG. 1a in which a seat body of a fixing seat is removed from one of co-moving portions in some exemplary embodiments, FIG. 6a is a schematic diagram of a local explosion structure of the co-moving portion of the hinge apparatus of FIG. 1a in some exemplary embodiments, FIG. 6b is a schematic diagram of a local explosion structure of the co-moving portion of FIG. 6a from another perspective. The first connection plate 13 is provided with a first sliding groove 133, the first connection rod 23 is provided with a first sliding portion 232, and the first sliding portion 232 is disposed in the first sliding groove 133 in a slidable manner; the second connection plate is provided with a second sliding groove, the second connection rod 24 is provided with a second sliding portion 242, and the second sliding portion 242 is disposed in the second sliding groove in a slidable manner.

Exemplarily, a portion of the first connection plate 13 located on a first surface of the first supporting plate 11 is provided with the first sliding groove 133, the first sliding groove 133 may be long-stripped and a length direction may be parallel to the second direction. One end of the first connection rod 23 is provided with the first sliding portion 232, and the other end is sleeved and fixed on the first rotating shaft 21. The first sliding portion 232 may be a columnar protrusion, and a shape of the first connection rod 23 may be an irregular shape and may be designed according to an actual situation. When the first connection plate 13 is driven by the first supporting plate 11 to rotate, the first connection plate 13 may drive the first connection rod 23 to rotate. During rotation of the first connection rod 23, the first sliding portion 232 slides along the first sliding groove 133, and the rotation of the first connection rod 23 drives the first rotating shaft 21 to rotate. Similarly, a portion of the second connection plate located on a first surface of the second supporting plate 12 is provided with the second sliding groove, the second sliding groove may be long-stripped and a length direction may be parallel to the second direction. One end of the second connection rod 24 is provided with the second sliding portion 242, and the other end is sleeved and fixed on the second rotating shaft 22. The second sliding portion 242 may be a columnar protrusion, and a shape of the second connection rod 24 may be an irregular shape, and may be designed according to an actual situation. When the second connection plate is driven by the second supporting plate 12 to rotate, the second connection plate may drive the second connection rod 24 to rotate. During rotation of the second connection rod 24, the second sliding portion 242 slides along the second sliding groove, and the rotation of the second connection rod 24 drives the second rotating shaft 22 to rotate. The first connection rod 23 and the second connection rod 24 may be symmetrically arranged.

In some exemplary embodiments, as shown in FIG. 5, the transmission apparatus may include a gear member 25 disposed in the fixing seat 20 in a rotatable manner; the gear member 25 may include a gear shaft 253, and a first gear 251 and a second gear 252 respectively disposed at two ends of the gear shaft 253, an axial direction of the gear shaft 253 is perpendicular to axial directions of the first rotating shaft 21 and the second rotating shaft 22, the first gear 251 meshes with a third gear 231 disposed on the first connection rod 23, and the second gear 252 meshes with a fourth gear 241 disposed on the second connection rod 24. Exemplarily, the first gear 251, the second gear 252, the third gear 231, and the fourth gear 241 may all be crown gears. The transmission apparatus of this embodiment may save space and has a good co-movement effect.

In other implementation modes, a gear mechanism with another structure may be adopted for the transmission apparatus. For example, the transmission apparatus may include a first gear and a second gear disposed in the fixing seat in a rotatable manner and meshed with each other, the first gear is meshed with a third gear disposed on a first rotating shaft, and the second gear is meshed with a fourth gear disposed on a second rotating shaft, axial directions of the first gear, the second gear, the third gear, and the fourth gear may be parallel to axial directions of the first rotating shaft and the second rotating shaft.

In some exemplary embodiments, as shown in FIG. 6a and FIG. 6b, the fixing seat 20 may include a seat body 202 and a clamping plate 203, the seat body 202 includes a base seat and a side wall disposed on the base seat, the side wall is provided with a first shaft hole 2021, a second shaft hole 2022, and an extension plate 2023, the extension plate 2023 is arranged opposite to the base seat, the extension plate 2023 is provided with a first fixing hole, and the base seat is provided with a second fixing hole at a position corresponding to the first fixing hole; the clamping plate 203 is interposed between the extension plate 2023 and the base seat, the clamping plate 203 is provided with a third fixing hole at a position corresponding to the first fixing hole and the second fixing hole. In a practical application, the seat body 202 and the clamping plate 203 may be fixed together through a fastener (such as a screw) passing through and being disposed in the first fixing hole, the second fixing hole, and the third fixing hole, and the fastener may also be disposed to fix the hinge apparatus of the embodiment of the present disclosure on another apparatus (such as a middle frame assembly of a foldable display apparatus). Among them, the first fixing hole, the second fixing hole, and the third fixing hole may sometimes be referred to as fixing holes 201 of the fixing seat 20. A side surface of the clamping plate 203 facing the side wall is provided with a first semi-arc groove, and the side wall is provided with a second semi-arc groove. The first semi-arc groove and the second semi-arc groove together form a shaft hole through which the gear shaft 253 of the gear member 25 passes, and the shaft hole is rotationally fitted with the gear shaft 253 of the gear member 25. One end of the first rotating shaft 21 and one end of the second rotating shaft 22 may both be provided with an annular convex edge, the first rotating shaft 21 and the second rotating shaft 22 may pass through the fixing seat 20 from the first shaft hole 2021 and the second shaft hole 2022 respectively, and annular convex edges at ends of the first rotating shaft 21 and the second rotating shaft 22 are clamped on an outer side of the fixing seat 20, which may play a limiting role. An insertion hole may be provided on a side surface of the fixing seat 20 facing the guide groove seat 10, and an insertion post inserted into the insertion hole may be disposed at a corresponding position of the guide groove seat 10. The fixing seat 20 and the guide groove seat 10 may be connected through fit of the insertion post and the insertion hole, so that the guide groove seat 10 may be sandwiched between two fixing seats 20 of two co-moving portions 200.

Figure 7:
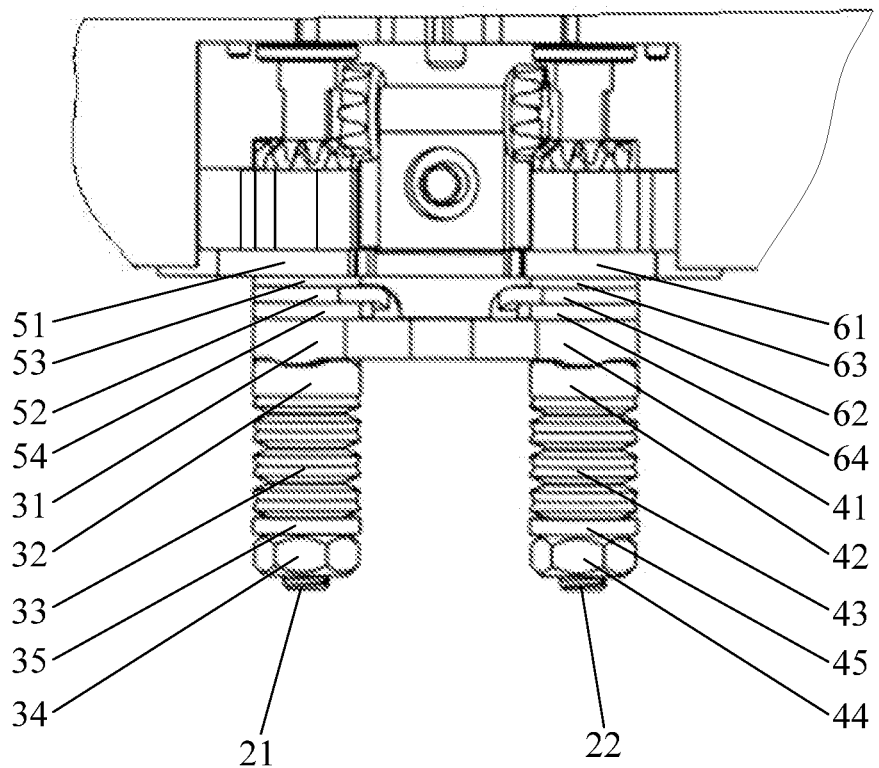
FIG. 7 is schematic diagram of a local structure of the hinge apparatus of FIG. 5.
Figure 8:
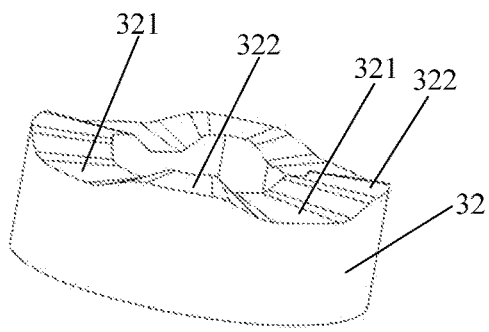
FIG. 8 is a schematic diagram of a structure of a first friction member or a second friction member in FIG. 7.
Figure 9:
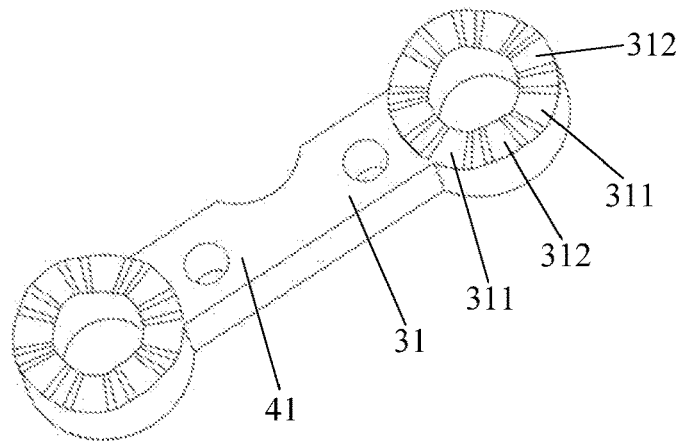
FIG. 9 is a schematic diagram of a structure of a first fixing frame and a second fixing frame connected into an integral structure in FIG. 7.

In some exemplary embodiments, as shown in FIG. 7, FIG. 8, and FIG. 9, FIG. 7 is schematic diagram of a local structure of the hinge apparatus of FIG. 5, FIG. 8 is a schematic diagram of a structure of a first friction member or a second friction member in FIG. 7, FIG. 9 is a schematic diagram of a structure of a first fixing frame and a second fixing frame connected into an integral structure in FIG. 7. The hinge apparatus may further include a first damping portion, and the first damping portion may include a first fixing frame 31, a first friction member 32, and a first elastic member 33; the first rotating shaft 21 may also passes through and be disposed in the first fixing frame 31 in a rotatable manner, the first friction member 32 is sleeved on the first rotating shaft 21 and can rotate together with the first rotating shaft 21, a first end face of the first friction member 32 is alternately provided with a first groove 321 and a first boss 322, the first fixing frame 31 is provided with a first friction surface fitted with the first end face of the first friction member 32, and the first friction surface is alternately provided with a second groove 311 and a second boss 312; one end of the first elastic member 33 is fixed and the other end abuts against a second end face of the first friction member 32; in a process that the first boss 322 is rotated from the second groove 311 to contact the second boss 312, the first friction member 32 can slide along the first rotating shaft 21 and squeeze the first elastic member 33, and the first elastic member 33 is squeezed by the first friction member 32 and elastically deformed.

Exemplarily, as shown in FIG. 7, the first damping portion may further include a first nut 34 threadedly connected on the first rotating shaft 21, and the first elastic member 33 may be a spring and be sleeved on the first rotating shaft 21 in a slidable manner, and is located between the first nut 34 and the first friction member 32. The first elastic member 33 may be a disc spring group including a plurality of disc springs, or may be a compression spring, or the like. A first end of the first elastic member 33 is limited through the first nut 34, and a second end of the first elastic member 33 abuts against the second end face of the first friction member 32. A first gasket 35 may be disposed between the first end of the first elastic member 33 and the first nut 34, and the first gasket 35 is sleeved on the first rotating shaft 21. In this example, holes of the first fixing frame 31, the first elastic member 33, and the first gasket 35 that are fitted with the first rotating shaft 21 may be round holes, and the first fixing frame 31, the first elastic member 33, and the first gasket 35 may slide along the first rotating shaft 21 but not rotate with the first rotating shaft 21. In other implementation modes, the first nut 34 may be replaced with another limiting piece, such as a snap ring.

Exemplarily, a circumferential surface of the first rotating shaft 21 may be provided with two planes in parallel, and a hole wall of the first friction member 32 that is fitted with the first rotating shaft 21 is correspondingly provided with two planes, so as to achieve that the first friction member 32 can rotate together with the first rotating shaft 21, and the first friction member 32 can slide along the first rotating shaft 21. As shown in FIG. 8, a highest position of the first boss 322 may be a plane which may be connected with a groove bottom (which may be a plane) of the first groove 321 through a bevel or a smooth curved surface. Accordingly, as shown in FIG. 9, a highest position of the second boss 312 may be a plane which may be connected with a groove bottom (which may be a plane) of the second groove 311 through a bevel or a smooth curved surface.

Exemplarily, as shown in FIG. 8 and FIG. 9, during rotation of the first supporting plate 11 and the second supporting plate 12 from a deployed state to a folded state, the first boss 322 may be rotated out of one of second grooves 311 and rotated into another of the second grooves 311 after passing through one of second bosses 312. For example, it is defined that when the first supporting plate 11 and the second supporting plate 12 are in the deployed state, a rotation angle of the first supporting plate 11 and the second supporting plate 12 is 90 degrees; when the first supporting plate 11 and the second supporting plate 12 are in the folded state, a rotation angle of the first supporting plate 11 and the second supporting plate 12 is 0 degree; then, when a rotation angle of the first supporting plate 11 and the second supporting plate 12 is in a range of 20 degrees to 70 degrees, the first boss 322 is in contact with the second boss 312, at this time, the first elastic member 33 may be squeezed by the first friction member 32 to generate maximum elastic deformation, then a maximum friction force is generated between the first end face of the first friction member 32 and the first friction face of the first fixing frame 31, so that the first supporting plate 11 and the second supporting plate 12 may stay at an arbitrary angle in a range of 20 degrees to 70 degrees. When the hinge apparatus according to the embodiment of the present disclosure is applied to a foldable display apparatus, a display screen may be folded into an arbitrary angle in a set angle range.

In some exemplary embodiments, as shown in FIG. 7, the hinge apparatus may further include a second damping portion, and the second damping portion includes a second fixing frame 41, a second friction member 42, and a second elastic member 43; the second rotating shaft 22 may also passes through and be disposed in the second fixing frame 41 in a rotatable manner, the second friction member 42 is sleeved on the second rotating shaft 22 and can rotate together with the second rotating shaft 22, a first end face of the second friction member 42 is alternately provided with a third groove and a third boss, the second fixing frame 41 is provided with a second friction surface fitted with the first end face of the second friction member 42, and the second friction surface is alternately provided with a fourth groove and a fourth boss; one end of the second elastic member 43 is fixed and the other end abuts against a second end face of the second friction member 42; in a process that the third boss is rotated from the fourth groove to contact with the fourth boss, the second friction member 42 can slide along the second rotating shaft 22 and squeeze the second elastic member 43, and the second elastic member 43 is elastically deformed by being squeezed by the second friction member 42. Exemplarily, the second fixing frame 41 in this example may be connected with the first fixing frame 31 into an integral structure.

Exemplarily, as shown in FIG. 7, the second damping portion may further include a second nut 44 threadedly connected on the second rotating shaft 22, and the second elastic member 43 may be a spring and be sleeved on the second rotating shaft 22 in a slidable manner, and is located between the second nut 44 and the second friction member 42. The second elastic member 43 may be a disc spring group including a plurality of disc springs, or may be a compression spring, or the like. A first end of the second elastic member 43 is limited through the second nut 44, and a second end of the second elastic member 43 abuts against the second end face of the second friction member 42. A second gasket 45 may be disposed between the first end of the second elastic member 43 and the second nut 44, and the second gasket 45 is sleeved on the second rotating shaft 22. In this example, holes of the second fixing frame 41, the second elastic member 43, and the second gasket 45 that are fitted with the second rotating shaft 22 may be round holes, and the second fixing frame 41, the second elastic member 43, and the second gasket 45 may slide along the second rotating shaft 22 but do not rotate with the second rotating shaft 22. In other implementation modes, the second nut 44 may be replaced with another limiting piece, such as a snap ring.

Exemplarily, a circumferential surface of the second rotating shaft 22 may be provided with two planes in parallel, and a hole wall of the second friction member 42 that is fitted with the second rotating shaft 22 is correspondingly provided with two planes, so as to achieve that the second friction member 42 can rotate together with the second rotating shaft 22, and the second friction member 42 can slide along the second rotating shaft 22. A highest position of the third boss may be a plane which may be connected with a groove bottom (which may be a plane) of the third groove through a bevel or a smooth curved surface. Accordingly, a highest position of the fourth boss may be a plane which may be connected with a groove bottom (which may be a plane) of the fourth groove through a bevel or a smooth curved surface.

Exemplarily, during rotation of the first supporting plate 11 and the second supporting plate 12 from the deployed state to the folded state, the third boss is rotated out of one of fourth grooves and rotated into another of the fourth grooves after passing through one of fourth bosses. For example, it is defined that when the first supporting plate 11 and the second supporting plate 12 are in the deployed state, a rotation angle of the first supporting plate 11 and the second supporting plate 12 is 90 degrees; when the first supporting plate 11 and the second supporting plate 12 are in the folded state, a rotation angle of the first supporting plate 11 and the second supporting plate 12 is 0 degree; then, when a rotation angle of the first supporting plate 11 and the second supporting plate 12 is in a range of 20 degrees to 70 degrees, the third boss is in contact with the fourth boss, at this time, the second elastic member 43 may be squeezed by the second friction member 42 to generate maximum elastic deformation, then a maximum friction force is generated between the first end face of the second friction member 42 and the second friction face of the second fixing frame 41, so that the first supporting plate 11 and the second supporting plate 12 may stay at an arbitrary angle in a range of 20 degrees to 70 degrees. When the hinge apparatus according to the embodiment of the present disclosure is applied to a foldable display apparatus, a display screen may be folded into an arbitrary angle in a set angle range.

In some exemplary embodiments, as shown in FIG. 7, the first damping portion may further include a first fixing member 51 fixed on the fixing seat 20, a second fixing member 52 fixed on the first fixing frame 31, a first friction plate 53, and a second friction plate 54; the first rotating shaft 21 may also passes through and be disposed in the first fixing member 51 and the second fixing member 52 in a rotatable manner, the first friction plate 53 and the second friction plate 54 are both sleeved on the first rotating shaft 21 and can rotate together with the first rotating shaft 21, the first friction plate 53 is located between the first fixing member 51 and the second fixing member 52, the first friction plate 53 generates a friction force with both the first fixing member 51 and the second fixing member 52 in a rotation process, the second friction plate 54 is located between the second fixing member 52 and the first fixing frame 31, and the second friction plate 54 generates a friction force with both the second fixing member 52 and the first fixing frame 31 in a rotation process. In this embodiment, a damping effect may be improved through friction forces generated between the first friction plate 53 and the second friction plate 54, and a corresponding component, so that the first supporting plate 11 and the second supporting plate 12 may stay at any rotational position.

Figure 10:
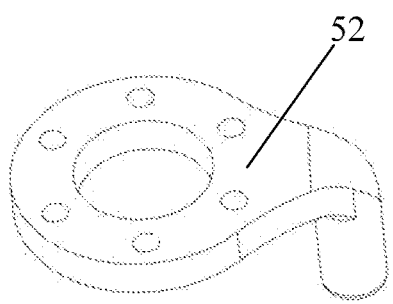
FIG. 10 is a schematic diagram of a structure of a second fixing member or a fourth fixing member in FIG. 7.
Figure 11:
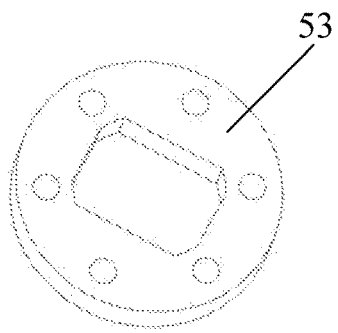
FIG. 11 is a schematic diagram of a structure of a friction plate in FIG. 7.

Exemplarily, as shown in FIG. 10 and FIG. 11, FIG. 10 is a schematic diagram of a structure of a second fixing member or a fourth fixing member in FIG. 7, FIG. 11 is a schematic diagram of a structure of a friction plate in FIG. 7, the second fixing member 52 is provided with a central hole fitted with the first rotating shaft 21, and a fixing post, and the fixing post may be inserted into a insertion hole provided on the first fixing frame 31. In order to increase a friction force, a plurality of protrusions may be disposed on a surface of the second fixing member 52 fitted with the first friction plate 53 and the second friction plate 54, and a plurality of protrusions may be disposed on surfaces of the first friction plate 53 and the second friction plate 54. Center holes of the first friction plate 53 and the second friction plate 54 that are fitted with the first rotating shaft 21 may be square holes so as to achieve the first friction plate 53 and the second friction plate 54 can rotate together with the first rotating shaft 21.

In some exemplary embodiments, as shown in FIG. 7, the second damping portion may further include a third fixing member 61 fixed on the fixing seat 20, a fourth fixing member 62 fixed on the second fixing frame 41, a third friction plate 63, and a fourth friction plate 64; the second rotating shaft 22 may also passes through and be disposed in the third fixing member 61 and the fourth fixing member 62 in a rotatable manner, the third friction plate 63 and the fourth friction plate 64 are both sleeved on the second rotating shaft 22 and can rotate together with the second rotating shaft 22, the third friction plate 63 is located between the third fixing member 61 and the fourth fixing member 62, the third friction plate 63 generates a friction force with both the third fixing member 61 and the fourth fixing member 62 in a rotation process, the fourth friction plate 64 is located between the fourth fixing member 62 and the second fixing frame 41, and the fourth friction plate 64 generates a friction force with both the fourth fixing member 62 and the second fixing frame 41 in a rotation process. In this embodiment, a damping effect may be improved through friction forces generated between the third friction plate 63 and the fourth friction plate 64, and a corresponding component, so that the first supporting plate 11 and the second supporting plate 12 may stay at any rotational position.

In this embodiment, the third fixing member 61 may be connected with the first fixing member 51 into an integral structure. A structure of the fourth fixing member 62 may be the same as that of the second fixing member 52, and structures of the third friction plate 63, the fourth friction plate 64, the second friction plate 54, and the first friction plate 53 may be the same.

Figure 12:
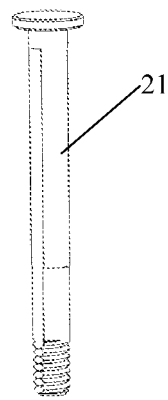
FIG. 12 is a schematic diagram of a structure of a first rotating shaft or a second rotating shaft in FIG. 7.

In some exemplary embodiments, as shown in FIG. 12, FIG. 12 is a schematic diagram of a structure of a first rotating shaft or a second rotating shaft in FIG. 7, the first rotating shaft 21 and the second rotating shaft 22 may have a same structure. Taking the first rotating shaft 21 as an example, a first end of the first rotating shaft 21 may be provided with an annular convex edge, and is disposed to be clamped on an outer side of the fixing seat 20, and a second end of the first rotating shaft 21 may be provided with a thread, and is disposed to be threadedly connected with the first nut 34. A shaft body of the first rotating shaft 21 is provided with a plane, and is disposed to be fitted with holes of some components of the first damping portion.

Figure 13A:
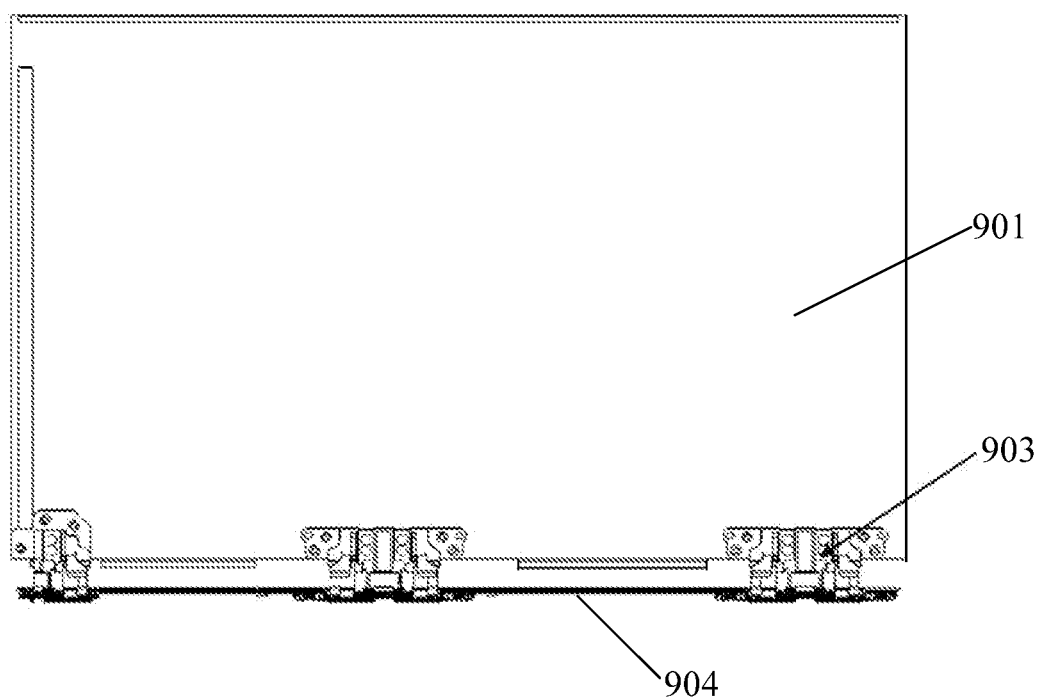
FIG. 13a is a schematic diagram of a structure of a middle frame assembly of a foldable display apparatus in a folded state according to some exemplary embodiments.
Figure 13B:
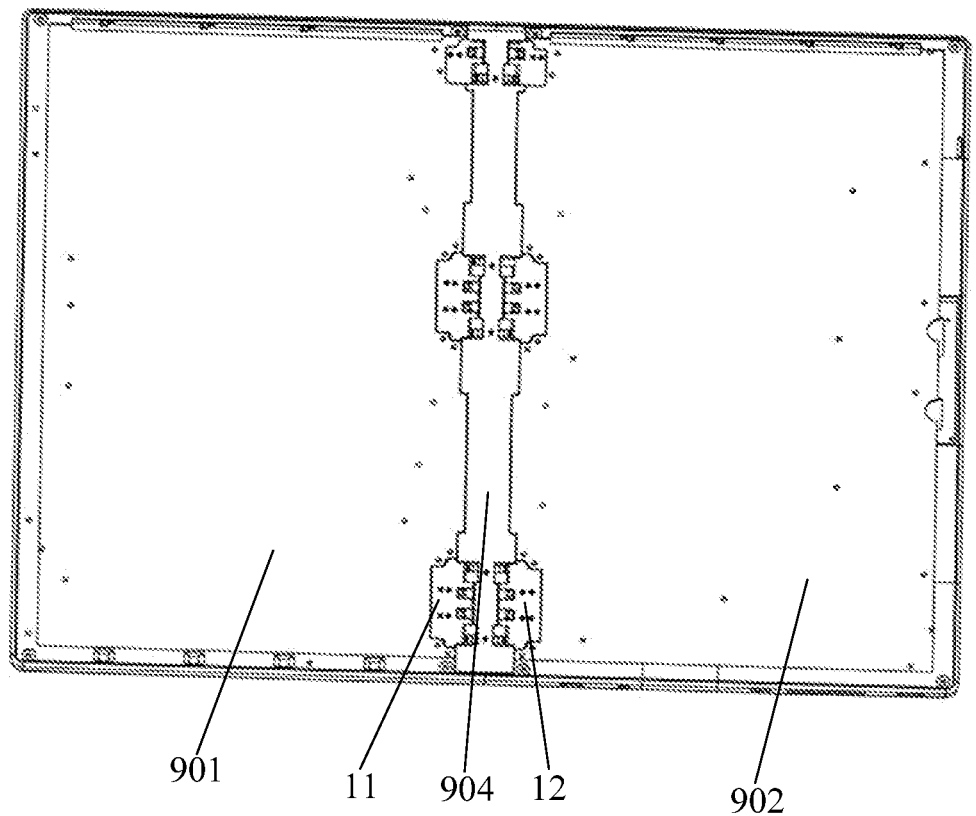
FIG. 13b is a schematic diagram of a structure of the middle frame assembly of FIG. 13a in a deployed state.
Figure 14:
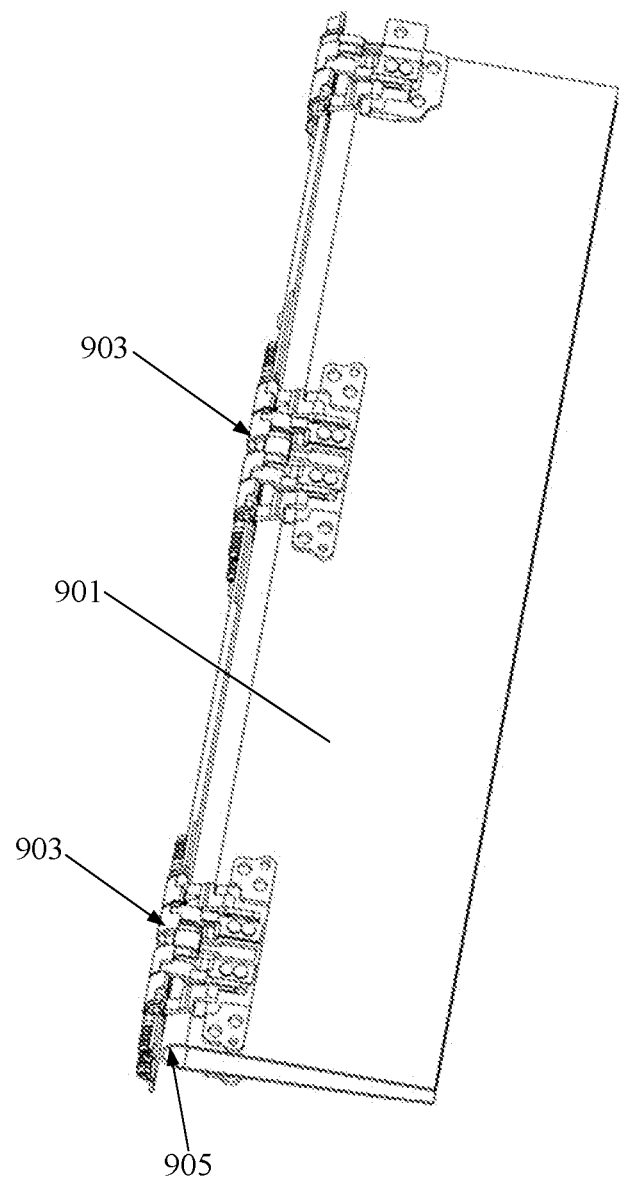
FIG. 14 is a schematic diagram of a structure of a foldable display apparatus in a folded state according to some exemplary embodiments.

An embodiment of the present disclosure also provides a foldable display apparatus, as shown in FIG. 13*a*, FIG. 13*b*, and FIG. 14, FIG. 13*a* is a schematic diagram of a structure of a middle frame assembly of a foldable display apparatus in a folded state according to some exemplary embodiments, FIG. 13*b* is a schematic diagram of a structure of the middle frame assembly of FIG. 13*a* in a deployed state, FIG. 14 is a schematic diagram of a structure of a foldable display apparatus in a folded state according to some exemplary embodiments, wherein the foldable display apparatus may include a flexible display module 905 and a middle frame assembly including a first plate body 901, a second plate body 902, and a hinge apparatus 903 described in any of previous embodiments; the first plate body 901 is fixedly connected with the first supporting plate 11, and the second plate body 902 is fixedly connected with the second supporting plate 12; a side of the flexible display module 905 facing away from a display side is fixed on the first plate body 901 and the second plate body 902.

Exemplarily, the first plate body 901 may be fixedly connected with the first supporting plate 11 through a third fastener (such as a screw) which passes through and is disposed in a first mounting hole 113 of the first supporting plate 11; the second plate body 902 may be fixedly connected with the second supporting plate 12 through a fourth fastener (such as a screw), and the fourth fastener passes through and is disposed in a second mounting hole 123 of the second supporting plate 12.

Exemplarily, the middle frame assembly may further include a third plate body 904 that may be fixedly connected with the fixing seat 20 of the co-moving portion 200 through a fifth fastener, and the fifth fastener passes through and is disposed in the fixing hole 201 of the fixing seat 20. Surfaces on a side of the first plate body 901, the second plate body 902, the first supporting plate 11, the second supporting plate 12, and the third plate body 904 are disposed to be flush, and the surfaces are configured to flat support the flexible display module 905 when the foldable display apparatus is in the deployed state. A side of the flexible display module 905 facing away from the display side may be adhered on the first plate body 901 and the second plate body 902 through an adhesive layer.

In other exemplary embodiments, the foldable display apparatus according to the embodiment of the present disclosure may include a flexible display module and the hinge apparatus described in any of previous embodiments, wherein a side of the flexible display module facing away from a display side may be fixed on the first supporting plate and the second supporting plate. In this embodiment, the flexible display module may be supported through the first supporting plate and the second supporting plate.

The foldable display apparatus according to the embodiment of the present disclosure may be a foldable display device, such as a mobile phone and a laptop.

In the description herein, "parallel" refers to a state in which an angle formed by two straight lines is above −10° and below 10°, and thus includes a state in which the angle is above −5° and below 5°. In addition, "perpendicular" refers to a state in which an angle formed by two straight lines is above 80° and below 100°, and thus includes a state in which the angle is above 85° and below 95°.

In the specification, for convenience, wordings indicating orientations or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing various constituent elements. Therefore, appropriate replacements may be made according to situations without being limited to the wordings described in the specification.

In the description herein, unless otherwise specified and defined explicitly, terms "connection", "fixed connection", "installation", and "assembly" should be understood in a broad sense, and, for example, may be a fixed connection, a detachable connection, or an integrated connection; terms "installation", "connection", and "fixed connection" may be a direct connection, an indirect connection through an intermediary, or communication inside two elements. For those ordinarily skilled in the art, meanings of the above terms in the embodiments of the present disclosure may be understood according to situations.

The invention claimed is:

1. A hinge apparatus, comprising a rotating portion and a co-moving portion; wherein
the rotating portion comprises a guide groove seat, a first supporting plate, a second supporting plate, a first connection plate, and a second connection plate; the guide groove seat is provided with a first non-circular arc guide groove, a second non-circular arc guide groove, a first circular arc guide groove, and a second circular arc guide groove; the first supporting plate is provided with a first non-circular arc rotating portion which is rotationally fitted with the first non-circular arc guide groove, the second supporting plate is provided with a second non-circular arc rotating portion which is rotationally fitted with the second non-circular arc guide groove, the first connection plate is provided with a first circular arc rotating portion which is rotationally fitted with the first circular arc guide groove, and the second connection plate is provided with a second circular arc rotating portion which is rotationally fitted with the second circular arc guide groove; the first connection plate is connected on the first supporting plate in a slidable manner, and the second connection plate is connected on the second supporting plate in a slidable manner;
the co-moving portion comprises a first connection rod, a second connection rod, a fixing seat, a first rotating shaft and a second rotating shaft disposed in the fixing seat in a rotatable manner and arranged in parallel, and a transmission apparatus; the first connection rod is fixedly connected on the first rotating shaft and is connected with the first connection plate in a slidable manner, the second connection rod is fixedly connected on the second rotating shaft and is connected with the second connection plate in a slidable manner, and the transmission apparatus is disposed to rotate the first rotating shaft and the second rotating shaft synchronously.

2. The hinge apparatus according to claim 1, wherein both the first connection plate and the second connection plate are provided as two, and the co-moving portion is provided as two;
a first connection rod of one of the two co-moving portions is connected with one of the two first connection plates, and a first connection rod of the other of the two co-moving portions is connected with the other of the two first connection plates; a second connection rod of one of the two co-moving portions is connected with one of the two second connection plates, and a second connection rod of the other of the two co-moving portions is connected with the other of the two second connection plates;
the first supporting plate and the second supporting plate are symmetrically disposed on both sides of the guide groove seat along a first direction, and the two co-moving portions are symmetrically disposed on both sides of the guide groove seat along a second direction, and the first direction and the second direction are perpendicular to each other.

3. The hinge apparatus according to claim 2, wherein the two first connection plates and the two second connection plates are both symmetrically disposed on both sides of the guide groove seat along the second direction, and the first connection plate and the second connection plate connected with a same co-moving portion are symmetrically disposed on both sides of the guide groove seat along the first direction.

4. The hinge apparatus according to claim 2, wherein the guide groove seat is arranged symmetrically with respect to a first symmetry axis and arranged symmetrically with respect to a second symmetry axis, the first symmetry axis is parallel to the first direction, and the second symmetry axis is parallel to the second direction.

5. The hinge apparatus according to claim 4, wherein the guide groove seat comprises two sub-guide groove seats, the two sub-guide groove seats are arranged symmetrically with respect to the second symmetry axis, each of the sub-guide groove seats is arranged symmetrically with respect to the first symmetry axis; each of the sub-guide groove seats is divided into two parts by the first symmetry axis, and each part of the two parts is provided with one non-circular arc guide groove and one circular arc guide groove;
the first supporting plate is provided with two first non-circular arc rotating portions, and the two first non-circular arc rotating portions are respectively rotationally fitted with two non-circular arc guide grooves located on one side of the first symmetry axis; the second supporting plate is provided with two second non-circular arc rotating portions, and the two second non-circular arc rotating portions are respectively rotationally fitted with two non-circular arc guide grooves located on the other side of the first symmetry axis;
the two first connection plates are each provided with one first circular arc rotating portion, and the two first circular arc rotating portions are respectively rotationally fitted with two circular arc guide grooves located on one side of the first symmetry axis; the two second connection plates are each provided with one second circular arc rotating portion, and the two second circular arc rotating portions are respectively rotationally fitted with two circular arc guide grooves located on the other side of the first symmetry axis.

6. The hinge apparatus according to claim 4, wherein the hinge apparatus is arranged symmetrically with respect to the first symmetry axis and arranged symmetrically with respect to the second symmetry axis.

7. The hinge apparatus according to claim 1, further comprising a first damping portion, wherein the first damping portion comprises a first fixing frame, a first friction member, and a first elastic member; the first rotating shaft also passes through and is disposed in the first fixing frame in a rotatable manner, the first friction member is sleeved on the first rotating shaft and is able to rotate together with the first rotating shaft, a first end face of the first friction member is alternately provided with a first groove and a first boss, the first fixing frame is provided with a first friction surface fitted with the first end face of the first friction member, and the first friction surface is alternately provided with a second groove and a second boss; one end of the first elastic member is fixed, and the other end abuts against a second end face of the first friction member; in a process that the first boss is rotated from the second groove to contact with the second boss, the first friction member is able to slide along the first rotating shaft and squeeze the first elastic member, and the first elastic member is elastically deformed by being squeezed by the first friction member;
or/and, further comprising a second damping portion, wherein the second damping portion comprises a second fixing frame, a second friction member, and a second elastic member; the second rotating shaft passes through and is disposed in the second fixing frame in a rotatable manner, the second friction member is sleeved on the second rotating shaft and is able to rotate together with the second rotating shaft, a first end face of the second friction member is alternately provided with a third groove and a third boss, the second fixing frame is provided with a second friction surface fitted with the first end face of the second friction member, and the second friction surface is alternately provided with a fourth groove and a fourth boss; one end of the second elastic member is fixed, and the other end abuts against a second end face of the second friction member; in a process that the third boss is rotated from the fourth groove to contact with the fourth boss, the second friction member is able to slide along the second rotating shaft and squeeze the second elastic member, and the second elastic member is elastically deformed by being squeezed by the second friction member.

8. The hinge apparatus according to claim 7, wherein in a process of rotation of the first supporting plate and the second supporting plate from a deployed state to a folded state, the first boss is rotated out of one of second grooves and rotated into another of the second grooves after passing through one of second bosses;
or/and, in a process of rotation of the first supporting plate and the second supporting plate from the deployed state to the folded state, the third boss is rotated out of one of fourth grooves and rotated into another of the fourth grooves after passing through one of fourth bosses.

9. The hinge apparatus according to claim 7, wherein the first damping portion further comprises a first nut threadedly connected on the first rotating shaft, the first elastic member is a spring and sleeved on the first rotating shaft in a slidable manner, and is located between the first nut and the first friction member;
or/and, the second damping portion further comprises a second nut threadedly connected on the second rotating shaft, the second elastic member is a spring and sleeved on the second rotating shaft in a slidable manner, and is located between the second nut and the second friction member.

10. The hinge apparatus according to claim 7, wherein the first damping portion further comprises a first fixing member fixed on the fixing seat, a second fixing member fixed on the first fixing frame, a first friction plate, and a second friction plate; the first rotating shaft also passes through and is disposed in the first fixing member and the second fixing member in a rotatable manner, the first friction plate and the second friction plate are both sleeved on the first rotating shaft and are able to rotate together with the first rotating shaft, the first friction plate is located between the first fixing member and the second fixing member, the first friction plate generates friction forces with both the first fixing member and the second fixing member in a rotation process, the second friction plate is located between the second fixing member and the first fixing frame, and the second friction plate generates friction forces with both the second fixing member and the first fixing frame in a rotation process;
or/and, the second damping portion further comprises a third fixing member fixed on the fixing seat, a fourth fixing member fixed on the second fixing frame, a third friction plate, and a fourth friction plate; the second rotating shaft also passes through and is disposed in the third fixing member and the fourth fixing member in a rotatable manner, the third friction plate and the fourth friction plate are both sleeved on the second rotating shaft and are able to rotate together with the second rotating shaft, the third friction plate is located between the third fixing member and the fourth fixing member, the third friction plate generates friction forces with both the third fixing member and the fourth fixing member in a rotation process, the fourth friction plate is located between the fourth fixing member and the second fixing frame, and the fourth friction plate generates friction forces with both the fourth fixing member and the second fixing frame in a rotation process.

11. The hinge apparatus according to claim 1, wherein the rotating portion further comprises a first fixing plate and a second fixing plate;
the first fixing plate is fixed on the first supporting plate through a first fastener, the first connection plate is sandwiched between the first fixing plate and the first supporting plate, the first connection plate is provided with a first sliding hole, the first fastener passes through the first sliding hole and is able to slide along the first sliding hole;
the second fixing plate is fixed on the second supporting plate through a second fastener, the second connection plate is sandwiched between the second fixing plate and the second supporting plate, the second connection plate is provided with a second sliding hole, the second fastener passes through the second sliding hole and is able to slide along the second sliding hole.

12. The hinge apparatus according to claim 1, wherein the first circular arc rotating portion rotates around a first rotation center line and the second circular arc rotating portion rotates around a second rotation center line, the first rotation center line and the second rotation center line are both parallel to axial directions of the first rotating shaft and the second rotating shaft.

13. The hinge apparatus according to claim 1, wherein the first connection plate is provided with a first sliding groove, the first connection rod is provided with a first sliding portion, and the first sliding portion is disposed in the first sliding groove in a slidable manner; the second connection plate is provided with a second sliding groove, the second connection rod is provided with a second sliding portion, and the second sliding portion is disposed in the second sliding groove in a slidable manner.

14. The hinge apparatus according to claim 1, wherein the transmission apparatus comprises a gear member disposed in the fixing seat in a rotatable manner; the gear member comprises a gear shaft, and a first gear and a second gear respectively disposed at both ends of the gear shaft, an axial direction of the gear shaft is perpendicular to axial directions of the first rotating shaft and the second rotating shaft, the first gear is meshed with a third gear disposed on the first connection rod, and the second gear is meshed with a fourth gear disposed on the second connection rod.

15. A foldable display apparatus, comprising a flexible display module and a middle frame assembly, wherein the middle frame assembly comprises a first plate body, a second plate body, and the hinge apparatus according to claim 1; the first plate body is fixedly connected with the first supporting plate, and the second plate body is fixedly connected with the second supporting plate; a side of the flexible display module away from a display side is fixed on the first plate body and the second plate body.

16. A foldable display apparatus, comprising a flexible display module and the hinge apparatus according to any one of claim 1, wherein a side of the flexible display module facing away from a display side is fixed on the first supporting plate and the second supporting plate.

17. A foldable display apparatus, comprising a flexible display module and a middle frame assembly, wherein the middle frame assembly comprises a first plate body, a second plate body, and the hinge apparatus according to claim 2; the first plate body is fixedly connected with the first supporting plate, and the second plate body is fixedly connected with the second supporting plate; a side of the flexible display module away from a display side is fixed on the first plate body and the second plate body.

18. A foldable display apparatus, comprising a flexible display module and a middle frame assembly, wherein the middle frame assembly comprises a first plate body, a second plate body, and the hinge apparatus according to claim 3; the first plate body is fixedly connected with the first supporting plate, and the second plate body is fixedly connected with the second supporting plate; a side of the flexible display module away from a display side is fixed on the first plate body and the second plate body.

19. A foldable display apparatus, comprising a flexible display module and the hinge apparatus according to claim 2, wherein a side of the flexible display module facing away from a display side is fixed on the first supporting plate and the second supporting plate.

20. A foldable display apparatus, comprising a flexible display module and the hinge apparatus according to claim 3, wherein a side of the flexible display module facing away from a display side is fixed on the first supporting plate and the second supporting plate.

\* \* \* \* \*